Feb. 26, 1929.  J. SCHADE  1,703,119
CARD SYSTEM
Filed March 28, 1927   4 Sheets-Sheet 1
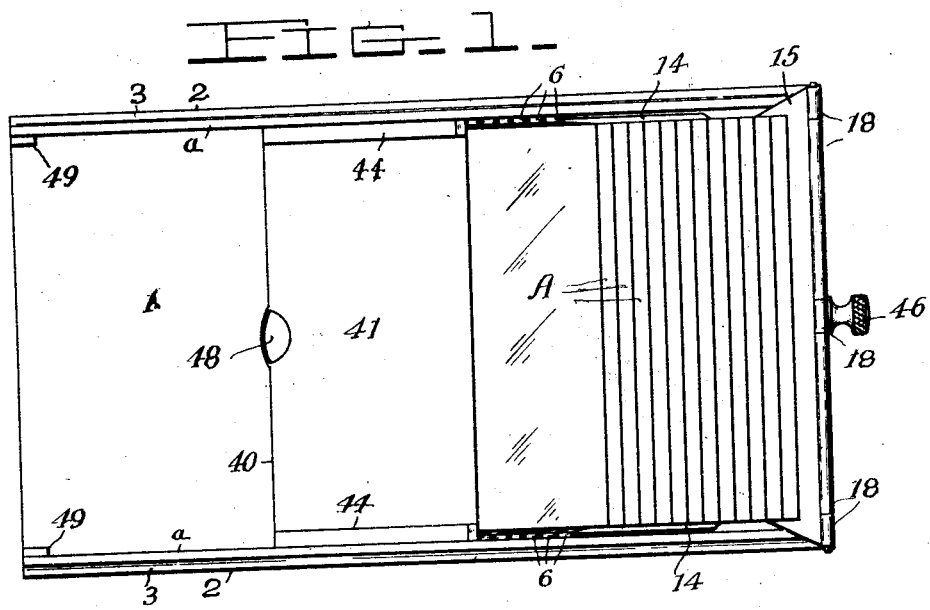
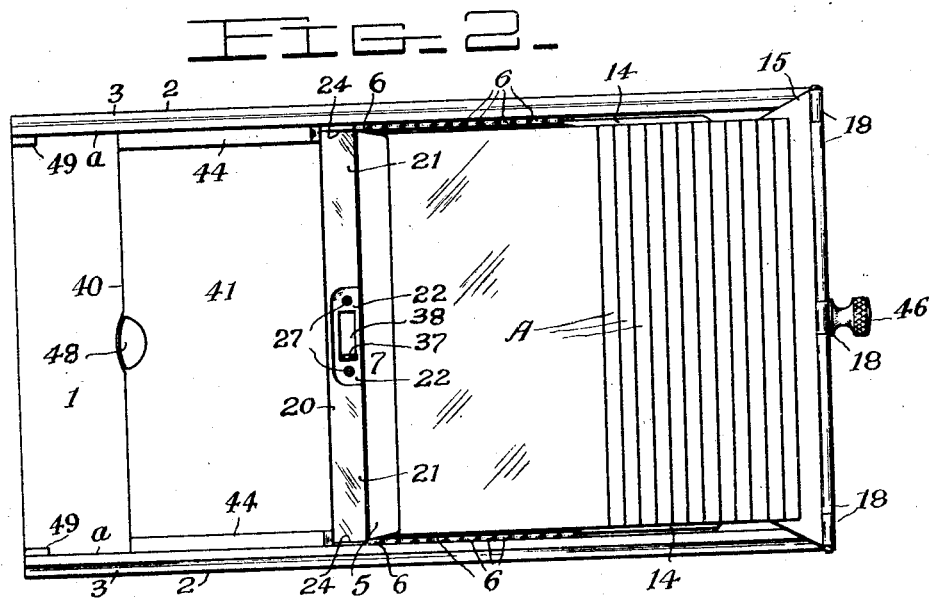
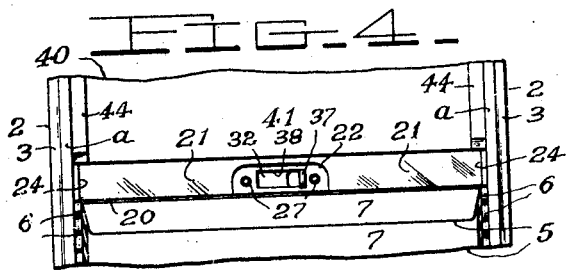
Inventor:
John Schade
by
Attorney Feb. 26, 1929.  J. SCHADE  1,703,119
CARD SYSTEM
Filed March 28, 1927  4 Sheets-Sheet 2
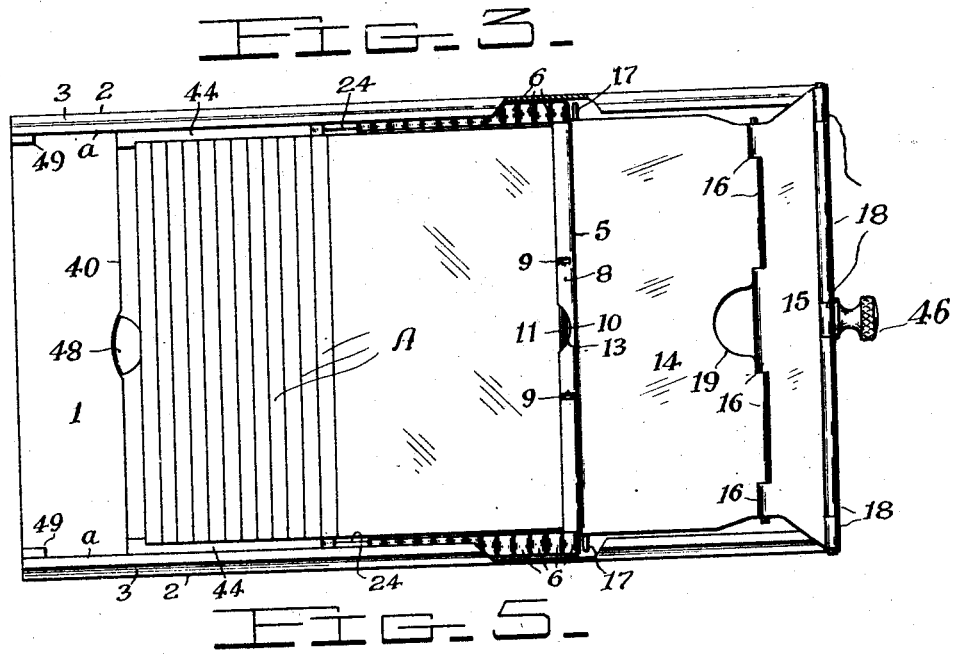
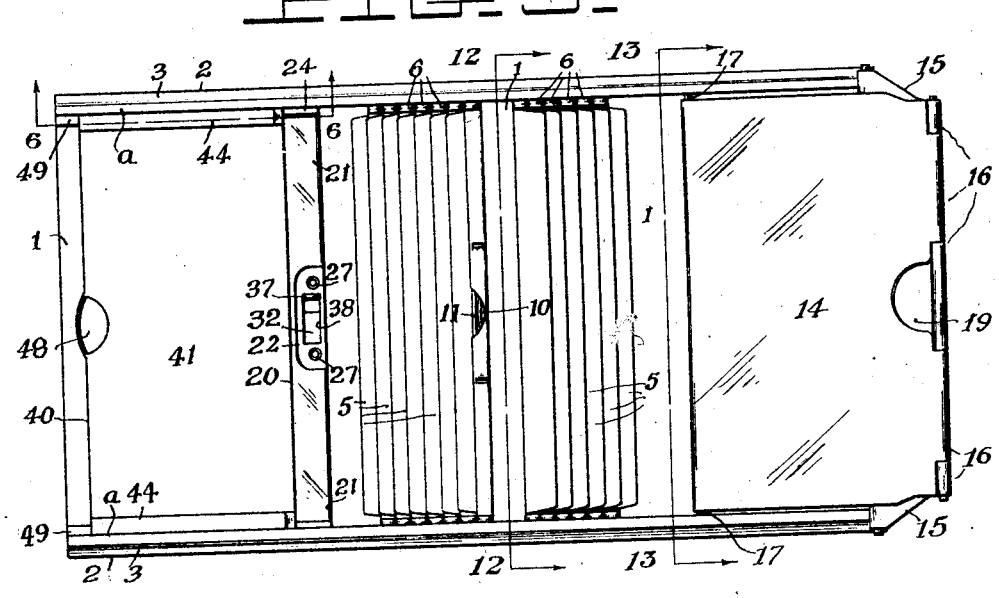
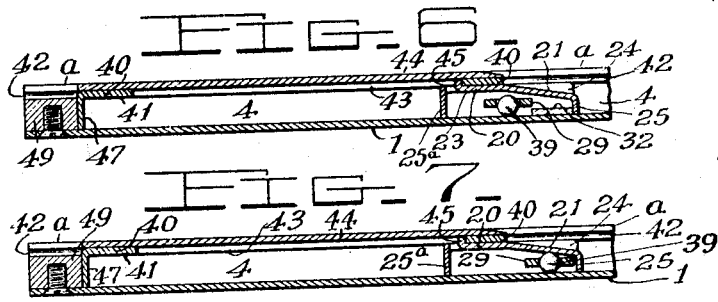
Inventor:
John Schade
by
Attorney

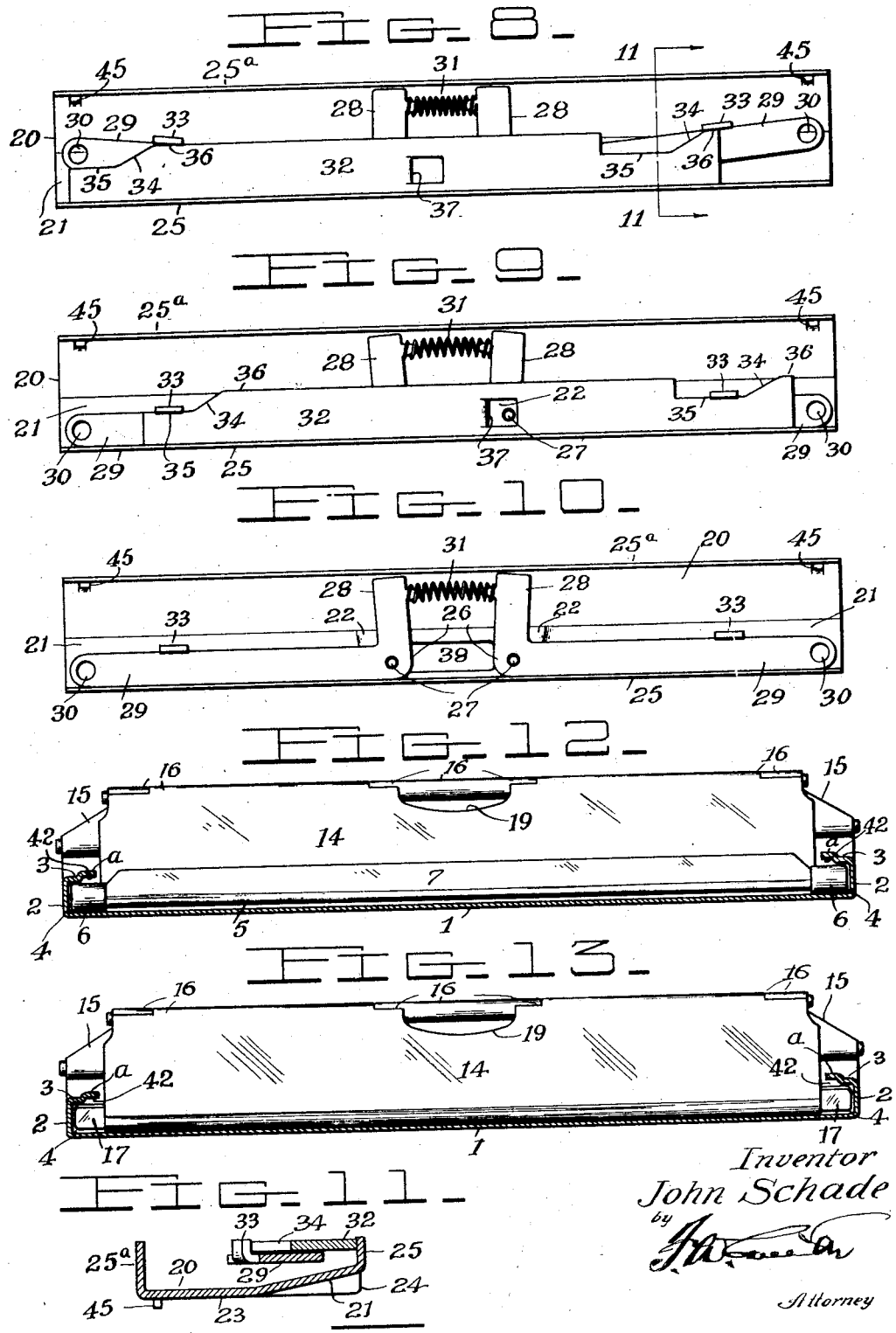

Feb. 26, 1929.  J. SCHADE  1,703,119
CARD SYSTEM
Filed March 28, 1927  4 Sheets-Sheet 4
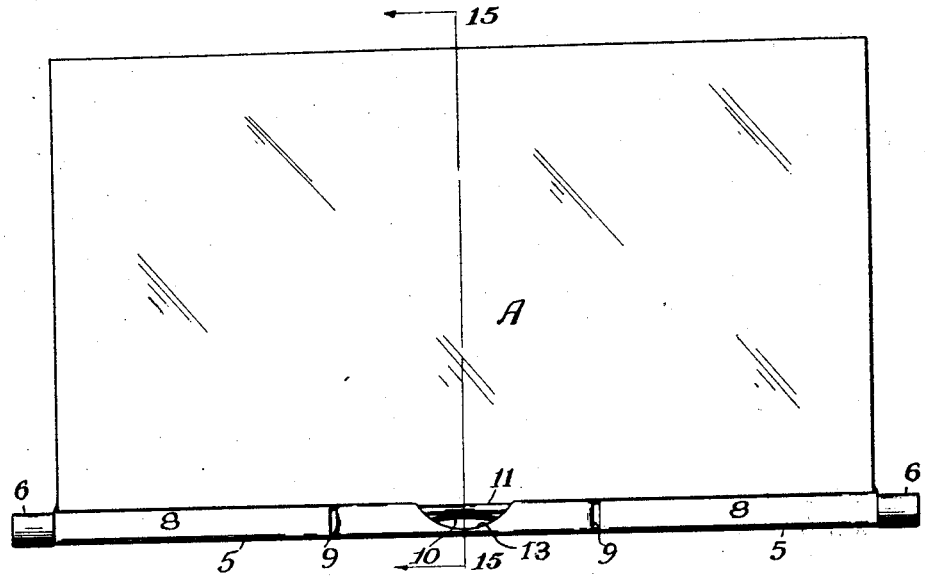
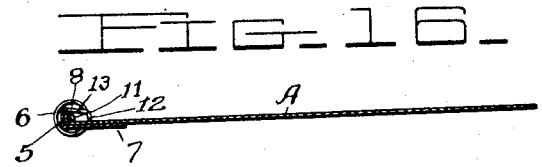
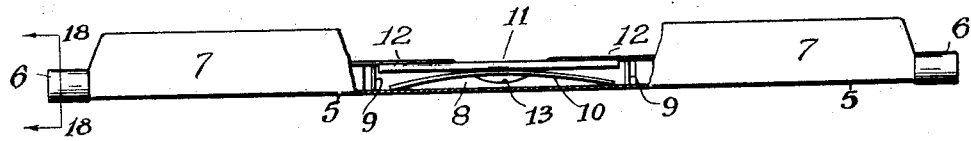
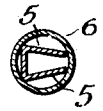
Inventor
John Schade
by
Attorney Patented Feb. 26, 1929.

1,703,119

UNITED STATES PATENT OFFICE.

JOHN SCHADE, OF HOLYOKE, MASSACHUSETTS, ASSIGNOR TO NATIONAL BLANK BOOK COMPANY, OF HOLYOKE, MASSACHUSETTS, A VOLUNTARY TRUST ASSOCIATION.

CARD SYSTEM.

Application filed March 28, 1927. Serial No. 178,914.

This invention relates to card systems, such as are in common use in instances where a considerable number of subjects or titles are to be conveniently classified.

One of the objects of the invention is to provide individual holders within which the cards may be readily inserted and quickly removed therefrom, the holders being so constructed and equipped that any pull or drag tending to accidentally remove a card will cause the latter to be more firmly held within the holders.

A further object is to provide a structure in which the holders themselves may readily be removed or inserted at any point of the mass of cards or holders.

A still further object is to provide means for securely binding the mass of holders both at the front and rear ends thereof.

And a still further object of the invention is to provide a follower plate at the rear of the holders which may be locked when positioned against the latter and which at all times is capable of a forward movement, but cannot be moved rearwardly until in an unlocked condition.

It is also the object of the invention to provide platens both at the front and at the rear of the mass of holders upon which the cards may rest for the purpose of making notations thereon, the rear platen being capable of a forward movement independent of the follower plate, for the purpose of confining the holders and cards preparatory to filing away in the usual cabinet.

Other objects of the invention will appear from the following description which is to be read in connection with certain drawings forming a part of this application and in which Figure 1 is a plan view of the improved card system as it appears when ready for filing in a cabinet, and Figure 2 is a similar view with the rear platen withdrawn so as to expose the follower plate in locked condition, the cards contained within the holders resting upon the front platen in both of these views—

Figure 3 is a partly broken plan view similar to Figure 2, but with the holders and their cards thrown rearwardly and resting upon the rear platen—

Figure 4 is a fragmentary plan view with the cards removed, similar to Figure 2 but showing the follower plate unlocked—

Figure 5 is a plan view of the system showing parts of the card holders turned in reverse directions and with the cards removed, the follower plate being unlocked, and the front and rear platens withdrawn—

Figure 6 is a section at the line 6—6 of Figure 5, and Figure 7 is a similar section showing the follower plate in locked condition—

Figure 8 is a detail bottom view of the follower plate with the parts in the position that they assume when the plate is in unlocked condition, and Figure 9 is a view like Figure 8 but showing the parts in the position that they assume when the plate is locked—

Figure 10 is a detail bottom view of the follower plate with the slide bar removed—

Figure 11 is a section at the line 11—11 of Figure 8—

Figure 12 is a section at the line 12—12 of Figure 5—

Figure 13 is a section at the line 13—13 of Figure 5—

Figure 14 is a detail plan view of one of the holders with a card therein—

Figure 15 is a section at the line 15—15 of Figure 14, and Figure 16 is a similar section but showing the floating clamping bar depressed so that the card may be withdrawn—

Figure 17 is a detail broken view of one of the holders showing particularly the construction of the floating resilient clamping bar, and Figure 18 is a section at the line 18—18 of Figure 17.

Similar numerals of reference denote like parts in the several figures of the drawing.

The card system proper is contained within a flat shallow tray having a bottom 1 and upstanding side edges 2 which terminate in inwardly extending flanges 3, whereby opposed channels or runways 4 are formed at the side edges of the tray.

5 are the card holders which are formed of sheet metal and have tubular terminals 6 secured to their ends, which terminals are positioned within the runways 4 and move freely throughout the same.

The backs of these holders are closed and the sides are bent toward each other, one of these sides 7 being longer than the other, for the purpose presently to be explained, while the other side 8 is inclined toward the first-mentioned side, so that the distance between the sides of each holder gradually decreases from the bottom toward the outer edges. Lanced from this side 8 and forced inwardly toward the side 7 are lugs 9 which are suitably spaced apart and between these lugs is a bow spring 10 that rests on the bottom of the holder and is surmounted by a floating clamping bar 11, both the spring and clamping bar being incapable of material endwise displacement owing to the presence of the lugs 9. The edge of the side 8 is inturned as shown at 12 and is spaced from the side 7 a distance sufficient to admit a card and the bar 11 is normally arrested in its upper movement by this edge.

The central part of the short edge 8 of each card holder is cut away as shown at 13 so as to expose the bar 11, and when it is desired to insert a card in a holder the card is merely pushed against the bar so as to depress it against the resiliency of the spring 10 and the card is then readily inserted within the holder, since the space between the bar and the side 7 increases when the bar is depressed, and this leaves ample room for the insertion of the edge of the card against the bottom of the holder, and the bar will be driven upwardly by the spring and will wedge the card firmly within the holder and it will be clear that any accidental pull or drag on the card will not cause its displacement from the holder but will cause it to be bound more tightly therein owing to the consequent drag on the bar that would cause the latter to become more firmly wedged against the card. When it is desired to release a card from the holder, the bar is manually depressed, which releases the card.

The side 7 is longer than the side 8 as before noted, to afford a support for the card at its lower edge, and although this is not an essential feature, nevertheless it is quite serviceable since it prevents the ready breaking of the card at the point where it is clamped to the holder.

At the front of the tray is a platen preferably formed of two members 14, 15, that are hinged together in toggle relation at the points 16, the inner member 14 having at the ends of its front edge flat lugs 17 that extend within the runways 4 so as to slide freely therein.

The outer member 15 is hinged at the points 18 to the front edge of the tray, and the central portion of the member 14 adjacent its line of hinging to the member 15 is cut away as shown at 19 so that the finger of one using the tray may be inserted in this opening and these members swung forward in overlapping relation as shown at Figure 5, the lugs 17 traveling freely within the runways during this swinging movement.

This forward swinging of the members 14, 15, affords a free space at the front of the holders 5 for the purpose of removing one or more of the holders or for adding holders, this being effected by sliding one end of a holder forward so as to cause a diagonal disposition of the same, additional holders being inserted in like manner.

When these platen members are thrown rearwardly, as shown at Figure 3, the rear edge of the inner member 14 will act as a stop for the mass of holders.

At the rear of the mass of holders is a follower plate 20 whose sides extend within said runways and track freely therein, and the top of whose front portion 21, slopes downwardly.

This follower plate 20 is a structure that comprises an upper or roof portion 23 which has secured to the ends of the top of its sloping portion blocks 24 so that it tracks evenly within the runways, and flanges 25, 25$^a$ that depend from the front and rear of the roof and rest upon the floor 1 of the tray, the flanged portion 25 serving as an abutment against the mass of holders to confine the latter in conjunction with the edge of the inner platen member 14, while both flanges afford a support for the platen on the floor of the tray.

The central portion 22 of the sloped part of the plate 20 is made flat and parallel with the floor of the tray, and to the underside of this portion bell-cranks 26 are pivoted at spaced locations 27.

The short levers 28 of these bell-cranks are consequently spaced apart and substantially parallel, and extend athwart the plate, while the long levers 29 extend in opposite directions lengthwise of the plate at its front edge and have ball seats 30 in their extremities.

31 is a coil spring which extends between the ends of short levers 28 and normally serve to act on these levers so as to force the long levers 29 against the flange 25 at the front of the plate, this being the locking position of these levers as shown particularly at Figure 10.

32 is a flat elongated slide bar which is positioned against the levers 29 and is confined laterally between the flange 25 and lips 33 that extend from said levers against the inner edge of the bar.

At the ends of this inner edge of the bar 32 are inclines 34, the edge of the slide bar at the bases of these inclines being straight as shown at 35, while such edge at the top of the inclines is likewise straight as shown at 36.

37 is a finger piece which is lanced from the bar 32 and extends upwardly therefrom through an elongated opening 38 cut within the central portion 22 of the follower plate 20, whereby, by the manipulation of this finger piece, the bar may be thrown to locking or unlocking positions.

The position of parts, when the follower plate is in locked condition is as is shown at Figure 9, the lips 33 being in contact with the straight edge portions 35 at the bases of the inclines 34, and when the slide bar 32 is manipulated to unlock the follower plate, the inclines 34 will act against the lips 33 and thereby force the long levers 29 rearwardly until these lips rest against the straight edge portions 36 at the top of these inclines, as is shown at Figure 8, and this will be effected against the resiliency of the coil spring 31 which always acts to effect the locking positions of these long levers.

Balls 39 occupy the seats 30 in these levers 29 and in the unlocked position of the latter these balls will rest against the bottom of the tray, as is shown at Figure 6 and when the slide bar 32 has been operated to bring the long levers 29 into locking position, these balls will be brought into firm wedging contact between the floor of the tray and the sloping portion 21 of the follower plate, as shown at Figure 7.

It will, therefore, be clear that at all times the follower plate may be readily moved forwardly even when in locked condition, but cannot be moved rearwardly unless the slide bar has been manipulated to bring the parts to the position shown at Figure 8.

40 is a rear platen which consists of a roof portion 41 slidably disposed at its sides within runways 42 that are formed by upward jogs or offsets a of the flanges 3, these jogs or offsets being at the inner edges of the flanges, so that the runways thus formed are in a plane above that of the runways 4, whereby this roof of the platen 40 will slide in a plane above the follower plate 20, for the purpose presently explained.

43 are elongated slots in each side of this roof and extending from a point near the front to a point near the rear, and to the roof over these slots are secured ribs 44 which not only close the slots as against the admission of dirt or foreign matter, but also contact the edges of the jogs a and hold the platen so that it will have no lateral play, and although these ribs may be omitted since they have nothing to do with the operation of the device, still it is preferred to employ them.

45 are studs which project upwardly from the ends of the roof 23 of the follower plate 20 within the slots 43, so that it will be clear that when the platen 40 is moved rearwardly it will first uncover the plate and then the forward end walls of these slots will strike the studs and carry the plate, when unlocked, rearwardly, and when said platen is moved forwardly, it will first cover the plate and then the rear ends of said slots will contact said studs, so that the continued forward movement of the platen will cause the plate to be forced against the mass of card holders.

But the usual procedure is to lock the plate 20 and to then slide the platen forwardly, so as to first cover the plate and thereafter move the latter, thus moving the plate against the card holders, the platen meanwhile moving forwardly with the plate and above the cards so as to hold the latter as shown at Figure 1, in order that such cards will not interfere with the placing of the tray, after the manner of a drawer, within a cabinet, the front end of the tray being equipped with a knob 46 for this purpose.

The rear edge 47 of the platen 40 depends and rests against the bottom of the tray, and about midway of the rear of the platen the latter is cut away as at 48 to provide a finger hold for the ready manipulation of the platen, and stops 49 are provided at the rear end of the tray against which the rear platen may abut so as to prevent the displacement thereof.

The tubular terminals 6 that contact each other within the runways 4, afford means for spacing the card holders so that they and their cards A will be in overlapping relation, and it will be obvious that both the front and the rear platens will serve as pads upon which the cards may be swung for the purpose of making notations on either face thereof.

It will likewise be evident that the holders may be removed and replaced or holders added at either end of the mass of holders or at intermediate locations therein.

While the front platen has been shown and described as consisting of hinged members, it will be evident that any integral platen that can be swung or slid away from the mass of holders may be employed, as for instance, such platen could be integral, with no connection with the runways 4, and hinged as shown to the front of the tray so that it could be swung bodily out of contact with the holders, or an integral platen could merely slide in the runways 4 just as in the instance of the rear platen, and the invention is not limited in these respects.

What is claimed is:—

1. A card system, comprising a shallow tray having a floor and opposed horizontally disposed runways at different elevations at the sides, card holders having their ends equipped for sliding freely in the lower runways, a follower plate slidable in said lower runways at the rear of said holders, means carried by said plate for locking it in any desired location, a platen slidable within the upper runways at the rear of said follower plate, connections between said plate and platen whereby the sliding movements of the latter beyond predetermined limits will effect the sliding movements of the former, and a platen at the front of said holders.

2. A card system, comprising a shallow tray having a floor and opposed inwardly facing horizontally disposed and differently elevated runways at the sides, card holders having their ends equipped to slide freely in the lower runways, a follower plate slidable in the lower runways at the rear of said holders, means carried by said plate for locking it at any desired location, a platen at the rear of said holders slidable in said upper runways to cover or uncover said follower plate, and an expansible and contractible platen at the front of said holders adapted to coact with the follower plate to prevent sliding of said holders, or to be retracted to permit additions or withdrawals of the latter by swinging them in the plane of the tray to free them from their runways.

3. A card system, comprising a shallow tray having a floor and opposed horizontally disposed runways at different elevations at the sides, card holders having their ends equipped for sliding freely in the lower runways, a follower plate slidable in said lower runways at the rear of said holders, means carried by said plate for locking it in any desired location, a platen slidable within the upper runways at the rear of said plate, connections between said plate and platen whereby the sliding movements of the latter beyond predetermined limits will effect the sliding movements of the former, and a platen at the front of said holders consisting of two flat members hinged together, the inner member having the ends of its free edge equipped to extend within said runways for free sliding movements therein, while the outer member is hinged to the front of the tray.

4. In a card system, a tray having upstanding sides that terminate in inwardly projected flanges, each flange having at its inner edge an upward offset, whereby two runways are provided one above the other.

5. In a card system employing a shallow tray having a floor and opposed inwardly facing horizontally disposed and differently elevated runways at the sides, card holders slidable within the lower runways and having closed backs, and sides that approach each other gradually with the free end of one side slightly spaced from the other side, a floating clamping bar confined within each holder, and a spring in said holder behind said bar, whereby a card may be inserted within the holder at one side of said bar and the resilient recovery of the bar will bind the card within the holder.

6. A construction as in claim 1, in which the follower plate has its front portion sloping downwardly and has pivoted to its bottom face a pair of spaced bell-cranks each of which has a long and a short lever, the short levers extending athwart said plate while the long levers extend lengthwise of the latter at its front edge and have ball seats in their extremities, in combination with an elongated slide bar which has a finger piece that extends through an opening in the face of said plate, said bar having inclines at the rear edges of its ends while said long levers have lips that overlap said edges, spring means for normally throwing said long levers into locking position with said lips at the bases of said inclines, and balls within said seats and carried by the locking movements of said levers into wedging contact between said sloping portions of the plate and the floor of said tray, the sliding movement of said bar to unlock the plate causing the inclines to act against the lips and force said long levers rearwardly against the resiliency of said spring means with the lips finally resting against said bar beyond the tops of the inclines and the balls thereby withdrawn from their aforesaid wedging contact.

7. In a card system, a card holder consisting of an elongated metal structure comprising a back and sides, one of which sides is wider than the other and extends at substantially a right angle from the back while the shorter side is inclined toward the longer side and is spaced at its edge therefrom a distance sufficient to admit a card, a clamping bar within the holder, speced lugs rigid with said holder to confine said bar as to lengthwise movement, and a spring back of said bar and functioning to normally project the bar toward the edge of the short side.

8. In a card system, a card holder consisting of an elongated metal structure comprising a back and sides, one of which sides is shorter than the other and is inclined toward the other side and is spaced at its edge therefrom a distance sufficient to admit a card, a spring-projected floating clamping bar within the holder and functioning to normally clamp the card against the longer side of the holder, said shorter side being cut away at its central portion to expose said bar whereby the latter may be manually depressed to release the card.

9. A card system, comprising a shallow tray having a floor and opposed inwardly facing horizontally disposed upper and lower runways at the sides, card holders having their ends equipped to slide freely in the lower runways, a follower plate slidable in the lower runways at the rear of said holders, means carried by said plate for locking it at any desired location, a platen at the rear of said holders slidable in said upper runways to cover or uncover said follower plate, connections between said platen and plate whereby the sliding movements of the former beyond predetermined limits will effect the sliding movements of the latter, and an expansible and contractible platen at the front of said holders adapted to coact with the follower plate to prevent sliding of said holders, or to be retracted to permit additions or withdrawals of the latter by swinging them in the plane of the tray to free them from their runways.

10. A card system comprising a shallow tray having a floor and opposed inwardly facing horizontally disposed upper and lower runways at the sides, card holders having their ends equipped to slide freely in the lower runways, a follower plate slidable in the lower runways at the rear of said holders, means carried by said plate for locking it at any desired location, a platen at the rear of said holders slidable in said upper runways to cover or uncover said follower plate, connections between said platen and plate whereby the forward sliding movement of the platen will first cover the plate and thereafter effect the sliding movement of the latter against said holders, while the rear sliding movement of said platen will first uncover the plate and thereafter effect the rearward sliding movement of the latter away from said holders.

In testimony whereof I affix my signature hereto.

JOHN SCHADE.